United States Patent [19]
Heitzinger et al.

[11] 3,960,604
[45] June 1, 1976

[54] DEVICE FOR TEMPERATURE MEASUREMENTS

[75] Inventors: Friedrich Heitzinger; Wilhelm Lechleitner, both of Reutte, Austria

[73] Assignee: Schwarzkopf Development Corporation, New York, N.Y.

[22] Filed: Apr. 15, 1974

[21] Appl. No.: 461,211

[30] Foreign Application Priority Data
Apr. 20, 1973  Austria .............................. 3588/73
Jan. 18, 1974  Austria .............................. 433/74

[52] U.S. Cl. .............................. 136/233; 136/201; 136/232; 136/236 R; 136/237
[51] Int. Cl.² ........................................ H01L 35/10
[58] Field of Search ........... 136/232, 233, 236, 237, 136/201

[56] References Cited
UNITED STATES PATENTS
3,048,641  8/1962  Erlebacher .......................... 136/232
3,554,816  1/1971  Moen .................................. 136/237

Primary Examiner—T. H. Tubbesing
Assistant Examiner—Richard E. Berger
Attorney, Agent, or Firm—Morgan, Finnegan, Pine, Foley & Lee

[57] ABSTRACT

An improved thermocouple sensor is disclosed comprising a pair of thermocouple wires formed from tungsten-rhenium or molybdenum-rhenium alloys and terminating in ends adapted for thermocouple application, and a metal mass of tungsten or molybdenum intimately contacting the terminal wire ends so as to form an electrical connection therebetween and means for making same.

23 Claims, 5 Drawing Figures

DEVICE FOR TEMPERATURE MEASUREMENTS

The present invention relates generally to novel thermocouple measuring devices and to the method of producing such devices. More particularly, it relates to a thermocouple measuring device wherein the thermocouples are formed from tungsten-rhenium or molybdenum-rhenium alloys, the terminal wire ends thereof being connected to a metal mass of tungsten or molybdenum metal. The thermocouples are surrounded by a thermocouple sheath, the measuring end thereof adapted to hold the metal mass and the opposite end sealed, preferably by a synthetic resin.

It has been suggested to measure high temperatures, for instance, from 1000° to 2500°C by means of thermocouples in which the wires are made from tungsten-rhenium or molybdenum-rhenium alloys. For example, thermocouples are known wherein one wire is made of a tungsten alloy containing 5% rhenium and the other of a tungsten alloy containing 26% rhenium. Also, thermocouples are known in which one wire is made of unalloyed molybdenum and the other of a molybdenum alloy containing 41% rhenium. The use, however, of molybdenum-rhenium and tungsten-rhenium thermocouples is disadvantaged by the fact that such alloys are difficult to weld in a satisfactory manner. As a result, it was found that the thermocouple junctions were very brittle and tend to break even under light loads. The present invention discloses a thermocouple device which is free of the aforesaid drawbacks.

Accordingly, this invention relates to a device for the measurement of temperature by means of thermocouples formed from molybdenum-rhenium or tungsten-rhenium alloys wherein the ends of the thermocouple wires at the measuring end of the device are intimately contacted with a metal mass, preferably a sintered-on plug, of tungsten or molybdenum which forms an electrical connection therebetween.

The metal mass of tungsten or molybdenum can be alloyed with rhenium. In this manner, it is possible to achieve an electrically conducting connection between the thermocouple wires at the junction without the need to weld the ends of the wires together.

The metal mass, such as a plug, may be made by forming a mold of molybdenum or tungsten metal powder admixed with a binder, at the terminal ends of the thermocouple wires. The thermocouple wires are embedded within this mass and allowed to set in the mold until the plug has solidified through drying or setting of the binder. The sintering of the plug takes place automatically by virtue of the high temperatures applied during service. The powder used for the metal mass may be alloyed with rhenium.

The devices of this invention make use of thermocouples made of molybdenum-rhenium or tungsten-rhenium alloys. When the thermocouple wires are formed from a tungsten-rhenium alloy, it is preferred to have one wire contain from about 1% to about 8% by weight of rhenium and the other from about 15% by weight to about 30% by weight rhenium. Even more preferred is the example where one wire contains 3% rhenium and the other contains 26% rhenium.

With respect to thermocouples formed from a molybdenum-rhenium alloy, it is preferred to have one wire contain from about 1% to about 10% by weight rhenium and the other from about 30% by weight to about 48% by weight of rhenium. Even more preferred is the example where one wire contains 5% rhenium and the other 41% rhenium.

The thermocouple sheaths for the device according to the invention can be gastight ceramic tubes or metalceramic tubes. The ceramic tubes are made preferably of refractory oxides such as silica, alumina, beryllia, zirconia or thoria. When metalceramic tubes are used, it is preferable to select materials for the tubes, the metallic component of which is identical with the base metal of the thermocouple wires. For instance, if the thermocouple wires consist of molybdenum-rhenium alloys, the metalceramic sheath should be made of a cermet, the metallic component of which is also molybdenum. An example is a metalceramic material consisting of finely disperse molybdenum and a refractory oxide such as zirconia, alumina, beryllia, thoria or silica. Analogously, when thermocouple wires of tungsten-rhenium alloys are to be used, the metalceramic sheath should have tungsten as the metallic phase.

The invention is illustrated by the diagrams.

Figure 1:
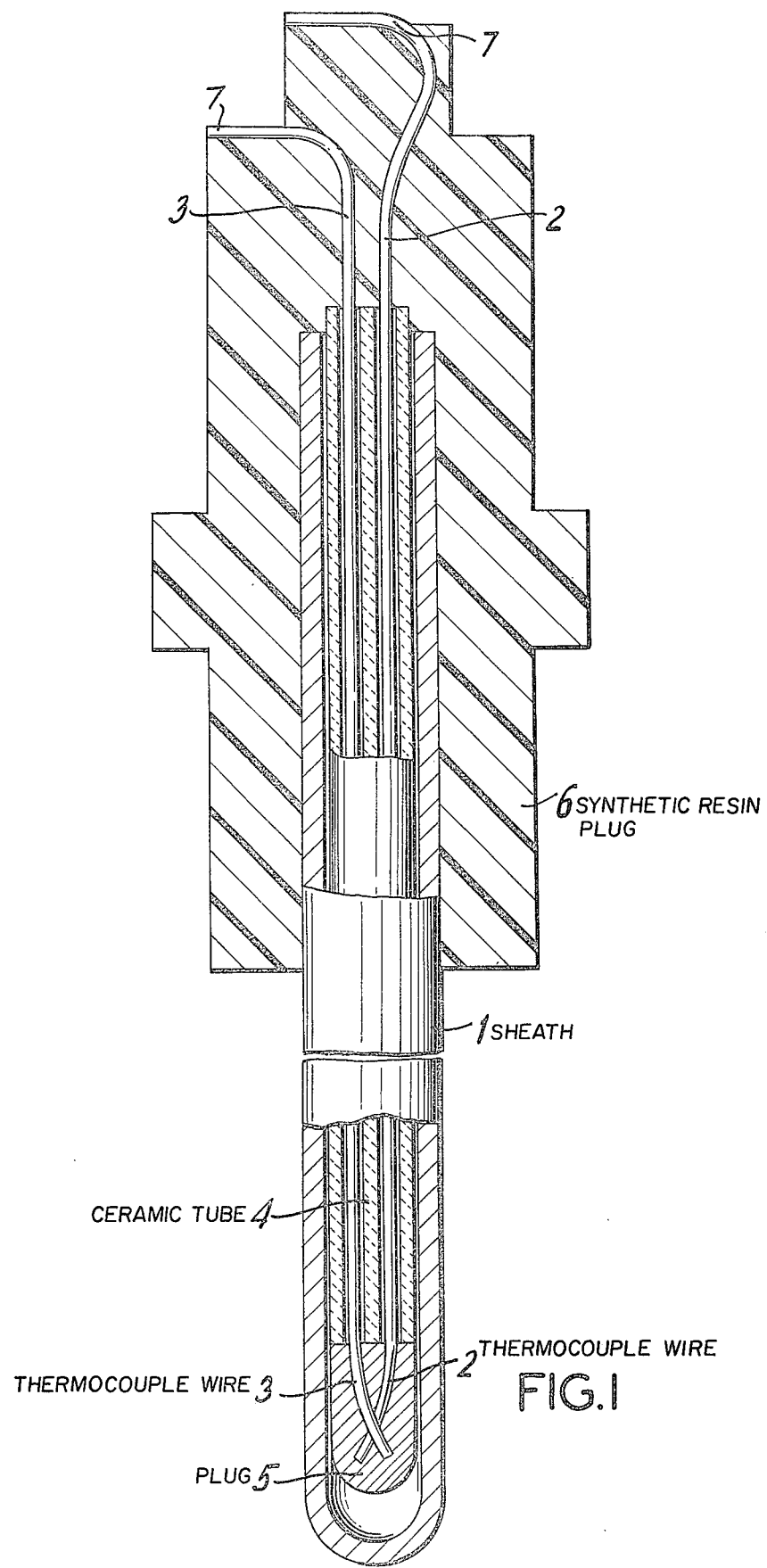
FIG. 1 is an elevational view and partial cross-section of the thermocouple measuring device in accordance with the invention.

FIG. 1 represents a device in accordance with the invention, which is equipped with the gastight sheath 1 of alumina. The thermocouple wires 2 and 3 consist of molybdenum alloys containing 5 and 41% rhenium. They are led to the measuring point by the ceramic tube 4 having two bores. At the measuring point, the ends of the thermocouple wires are connected electrically via the plug 5 formed of sintered molybdenum powder. At the end of the sheath opposite to the measuring point, the thermocouple wires are inserted through a gastight plug of synthetic resin. Although this seal is not quite vacuum-tight, it is adequate for the purpose because the molybdenum plug 5 acts to some extent as a getter. It can absorb residual quantities of oxygen contained in the sheath or diffusing into the sheath during service. For service, a clamp can be attached to the end of the thermocouple wires opposite the junction by means of which the electrical connection with the actual measuring device is established.

Figure 2:
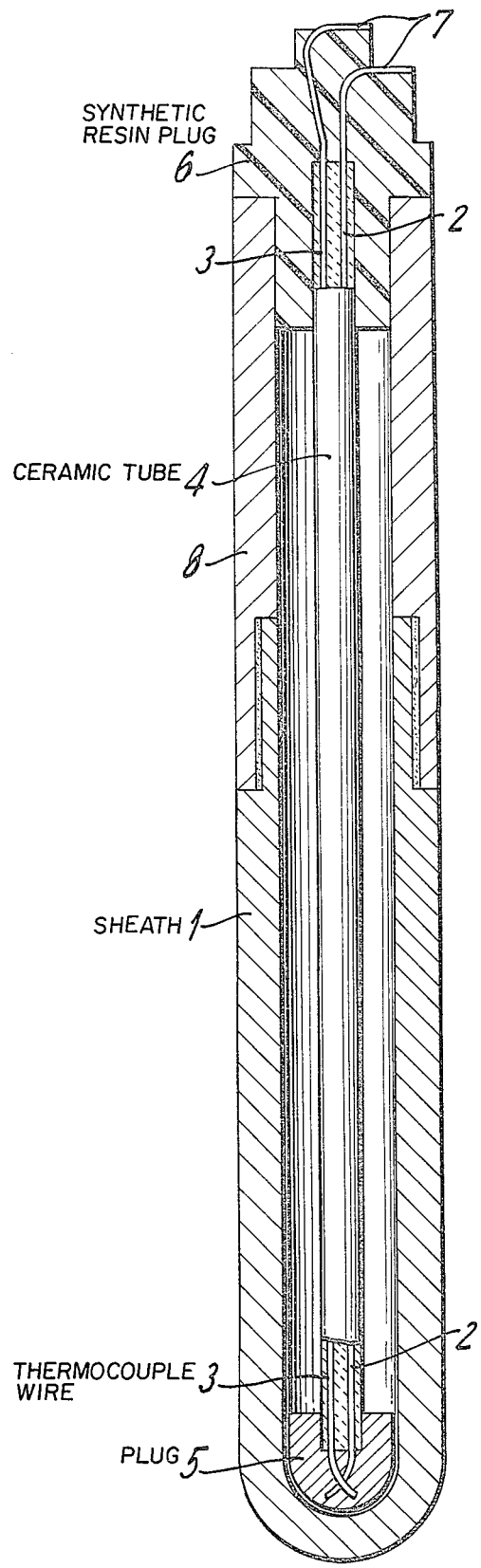
FIG. 2 is an elevational view and partial cross-section of certain embodiments of the thermocouple measuring device in FIG. 1.

FIG. 2 shows a measuring arrangement in accordance with the invention in which the thermocouple sheath 1 consists of metalceramic material. This material contains in fine dispersion 60 volume per cent molybdenum and 40% zirconia which may be stabilized by additions of 4 to 10% by weight of calcium or magnesium oxide. However, only the lower part of the thermocouple sheath consists of this alloy, whilst the part 8 which is not exposed to high temperatures, is formed by a steel tube connected with the metal-ceramic tube 1 by means of a heat-resistant cement.

Figure 3:
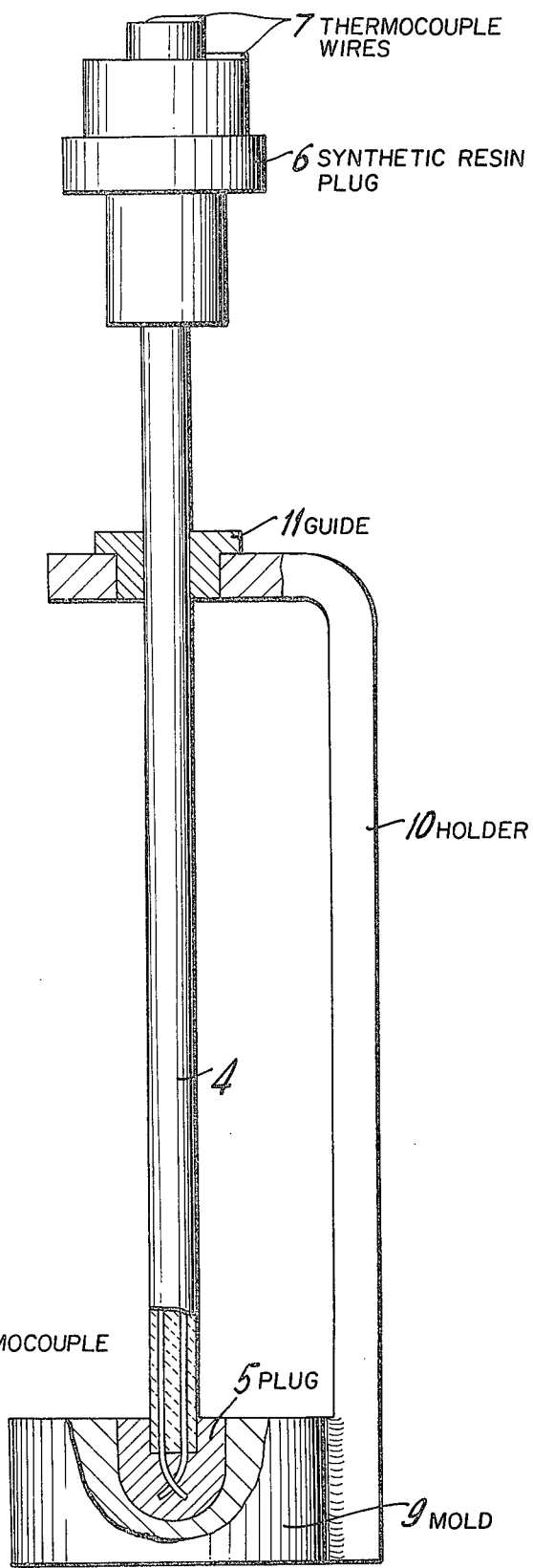
FIG. 3 is an elevational view and partial cross-section representing the manner in which the plug arrangement of this invention can be produced.

FIG. 3 shows an arrangement for producing the plug 5 consisting of molybdenum or tungsten. It consists of the mold 9, the holder 10 and the guide 11. The ceramic tube 4 equipped with the thermocouple wires and the synthetic resin plug 6 is inserted with its lower end into a recess in the mold 9. The recess is filled with a mixture of molybdenum powder and a volatile binder. The thermocouple wires are surrounded with this mass and left in the mold until the plug has solidified through drying or setting of the binder. The measurement device can then be inserted into the thermocouple sheath. The final consolidation of the plug is effected by the high service temperatures.

Figures 4, 5:
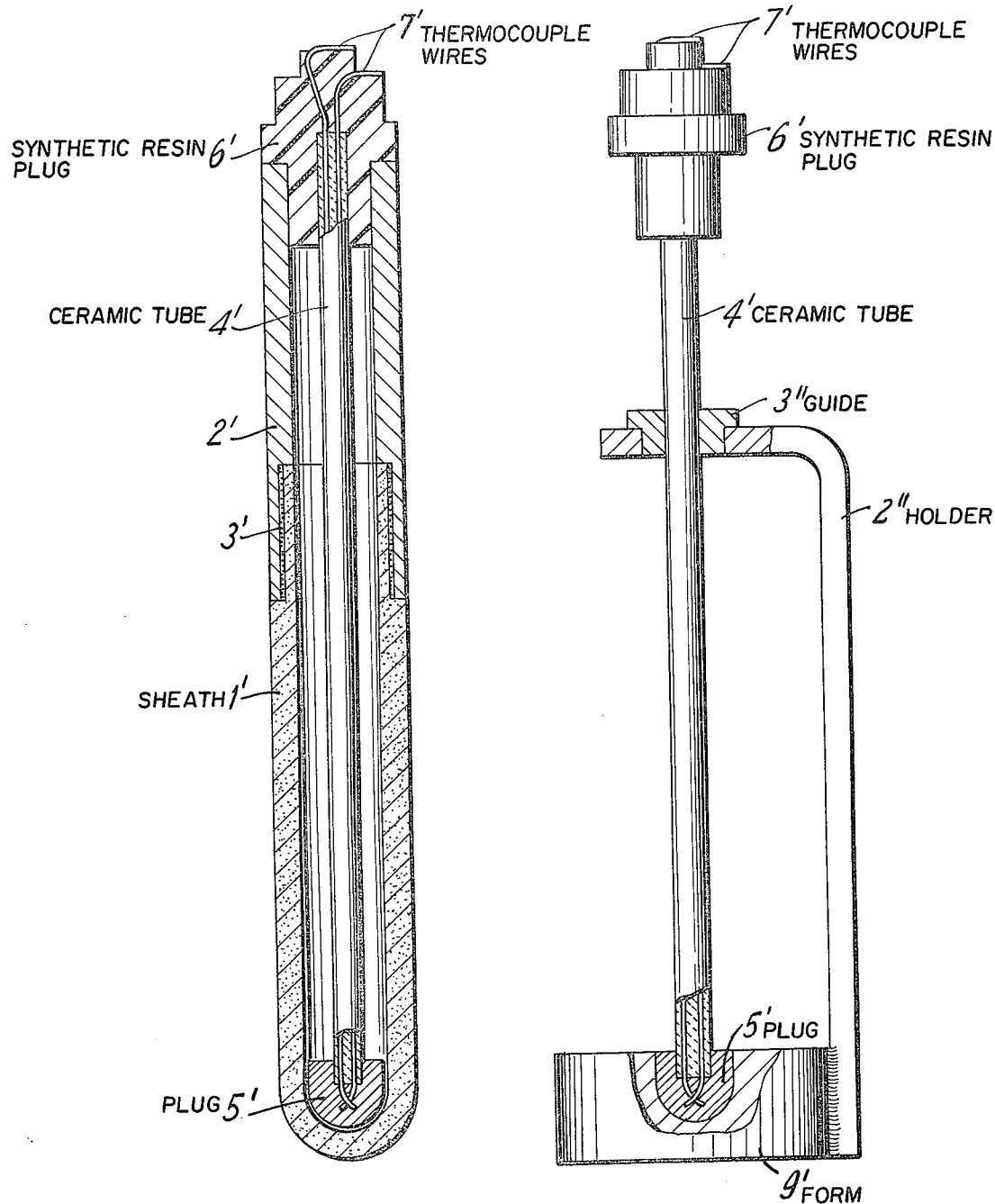
FIG. 4 is an elevational view and partial cross-section of certain embodiments of the thermocouple measuring device in FIG. 1.
FIG. 5 is an elevational view and partial cross-section representing, in one embodiment, the manner in which the plug arrangement of this invention can be produced.

FIG. 4 represents another embodiment of the disclosed device in accordance with the invention, by means of which temperatures of molten metal up to 2000°C can be measured. The device is suitable for single as well as continuous measurement. The part 1' of the thermocouple sheath immersed in the molten metal consists of a metalceramic material containing finely dispersed 40% molybdenum and 60% zirconia, which may be stabilized by addition of 4 to 10% calcium oxide or magnesia. The cooler part 2' of the sheath consists of steel and is connected with part 1' by means of a heatresistant cement. The ceramic tube 4' equipped with two bores serves as a guide for the thermocouple wires leading to the junction. The two ends of the thermocouple wires are surrounded by the molybdenum plug 5' at the junction. The thermocouple wires consist of molybdenum-rhenium alloy with a rhenium content of 5 and 41% rhenium, respectively. At the end of the sheath opposite to the junction end, the wire inlet is sealed by means of a synthetic resin plug 6'. Although this seal is not vacuum-tight, it is sufficient for practical purposes, because the molybdenum plug 5' has a certain scavenger effect and is able to absorb small residues of oxygen contained in the sheath or small quantities of oxygen which diffuse into the sheath during service. When the measuring device is to be used, a clamp is attached to the end of the sheath opposite to the junction by means of which the electrical connection between the thermocouple wires 7' and the actual measuring device is established.

FIG. 5 shows in another embodiment, an arrangement for producing the plug 5'. It consists of a form 9', the holder 2' and the guide 3'. The ceramic tube 4' equipped with the thermocouple wires and the synthetic resin plug 6' is lowered into a cavity in the form 9'. The cavity is filled with a mixture of molybdenum powder and a suitable binder. This mass surrounds the thermocouple wires and is left in the form until the plug has solidified by drying or setting of the binder. The measuring device can then be inserted into the thermocouple sheath. The final consolidation of the plug then takes place during service.

What is claimed is:

1. In a thermocouple measuring device for the measurement of temperature, an improved thermocouple sensor comprising a pair of thermocouple wires formed from tungsten-rhenium or molybdenum-rhenium alloys and terminating in ends adapted for thermocouple application,
and a metal mass of tungsten or molybdenum intimately contacting said terminal wire ends so as to form an electrical connection therebetween at the measuring end of the device.

2. Device according to claim 1 wherein said metal mass is a sintered plug.

3. Device according to claim 1 wherein said pair of thermocouple wires is comprised of a molybdenum-rhenium alloy, one wire thereof containing from about 1% to about 10% rhenium and the other from about 30% to about 48% rhenium.

4. Device according to claim 3 wherein one wire contains 5% rhenium and the other contains 41% rhenium.

5. Device according to claim 1 wherein said tungsten or molybdenum metal mass is alloyed with rhenium.

6. Device according to claim 1 further comprising a hollow sheath dimensioned to receive said metal mass.

7. Device according to claim 6 wherein said sheath is a gastight ceramic tube.

8. Device according to claim 7 wherein said ceramic tube is made of a refractory oxide.

9. Device according to claim 6 wherein said sheath is a metal ceramic tube, the metallic component of which is the same base metal as that of the thermocouple wires.

10. Device according to claim 9 wherein said metal ceramic tube comprises molybdenum or tungsten metal combined with a refractory oxide.

11. Device according to claim 10 wherein said refractory oxide is zirconia.

12. Device according to claim 11 wherein the metal ceramic tube further comprises from about 4% to about 10% by weight of calcium oxide or magnesia.

13. Device according to claim 6 wherein said metal mass and hollow sheath are shaped so that said metal mass is in conforming contact with said sheath at the measuring end of the device.

14. Device according to claim 6 further comprising a seal at the end of the sheath opposite said measuring end.

15. Device according to claim 14 wherein said seal is comprised of a synthetic resin.

16. Device according to claim 6 further comprising a rigid tube containing said pair of wires and connected to said metal mass so as to extend therefrom axially within said sheath.

17. A method for the production of a device according to claim 1 which comprises inserting the ends of a pair of thermocouple wires formed from tungsten-rhenium or molybdenum-rhenium alloys into a mold containing powdered tungsten or molybdenum metal admixed with a binder, permitting the molded metal mass to solidify and removing the resulting solidified metal mass from the mold.

18. The method of claim 17 wherein said molded metal mass solidifies by setting.

19. The method of claim 17 wherein said binder is volatile and said molded metal mass solidifies by drying.

20. The method of claim 17 wherein said pair of thermocouple wires is comprised of a molybdenum-rhenium alloy, one wire thereof containing from about 1% to about 10% rhenium and the other from about 30% to about 48% rhenium.

21. The method of claim 20 wherein one wire contains 5% rhenium and the other contains 41% rhenium.

22. The method of claim 17 wherein said tungsten or molybdenum metal is alloyed with rhenium.

23. The method of claim 17 further comprising the step of inserting the resulting device into a thermocouple sheath and sintering the molded metal mass.

* * * * *